US011524650B2

(12) United States Patent
Ichimura et al.

(10) Patent No.: US 11,524,650 B2
(45) Date of Patent: Dec. 13, 2022

(54) HEAD PORTION PROTECTION AIRBAG DEVICE

(71) Applicant: TOYODA GOSEI CO., LTD., Kiyosu (JP)

(72) Inventors: Takashi Ichimura, Kiyosu (JP); Hiroki Imaeda, Kiyosu (JP); Junpei Hamamoto, Kiyosu (JP); Makoto Yamanaka, Kiyosu (JP); Hiroshi Kato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/172,808

(22) Filed: Feb. 10, 2021

(65) Prior Publication Data
US 2021/0253056 A1    Aug. 19, 2021

(30) Foreign Application Priority Data
Feb. 13, 2020    (JP) .............................. JP2020-022803

(51) Int. Cl.
*B60R 21/213*    (2011.01)
*B60R 21/237*    (2006.01)
*B60R 21/232*    (2011.01)

(52) U.S. Cl.
CPC .......... *B60R 21/213* (2013.01); *B60R 21/232* (2013.01); *B60R 21/237* (2013.01)

(58) Field of Classification Search
CPC ... B60R 21/201; B60R 21/213; B60R 21/232; B60R 21/237; B60R 2021/161
See application file for complete search history.

(56) References Cited

U.S. PATENT DOCUMENTS

| | | | |
|---|---|---|---|
| 5,899,486 A * | 5/1999 | Ibe | B60R 21/232 280/728.2 |
| 6,412,810 B1 * | 7/2002 | Wipasuramonton | B60R 21/261 280/730.2 |
| 6,626,456 B2 * | 9/2003 | Terbu | B60R 21/20 280/728.2 |

(Continued)

FOREIGN PATENT DOCUMENTS

| JP | 2011121473 A | * | 6/2011 |
| JP | 2015016731 A | * | 1/2015 |

(Continued)

*Primary Examiner* — Laura Freedman
(74) *Attorney, Agent, or Firm* — Posz Law Group, PLC

(57) ABSTRACT

A head portion protection airbag device includes: an airbag, formed into a folded body being folded such that a lower edge side in an unfolded state approaches an upper edge side, wrapped with an unfoldment preventing tape material and attached to the upper edge side of the window, assembled with a twisting restriction member, which is configured to prevent twisting of the folded body, on an upper edge side of the airbag, and attached to the upper edge side of the window as a bag attachment body. A plurality of attachment piece portions, which are attached to a body side of the vehicle, are arranged side by side on the upper edge side of the airbag. The bag attachment body is wrapped with the tape material in a state where the twisting restriction member is assembled to the upper edge side of the airbag in the folded body.

6 Claims, 20 Drawing Sheets

(56) References Cited

U.S. PATENT DOCUMENTS

| | | | |
|---|---|---|---|
| 6,722,693 B2* | 4/2004 | Ikeda | B60R 21/201 280/730.2 |
| 6,742,806 B2* | 6/2004 | Ogawa | B60R 21/201 280/732 |
| 7,077,424 B2* | 7/2006 | Inoue | B60R 21/213 280/730.2 |
| 7,083,188 B2* | 8/2006 | Henderson | B60R 21/201 280/728.2 |
| 7,121,579 B2* | 10/2006 | Ochiai | B60R 21/04 280/730.2 |
| 7,125,038 B2* | 10/2006 | Gammill | B60R 21/232 280/728.2 |
| 7,159,896 B2* | 1/2007 | Ochiai | B60R 21/201 280/730.2 |
| 7,261,316 B1* | 8/2007 | Salmo | B60R 21/232 280/730.2 |
| 7,331,598 B2* | 2/2008 | Inazu | B60R 21/213 280/728.2 |
| 7,631,889 B2* | 12/2009 | Watanabe | B60R 21/213 280/728.2 |
| 7,748,734 B2* | 7/2010 | Wilmot | B60R 21/201 280/730.2 |
| 7,762,581 B2* | 7/2010 | Kino | B60R 21/232 280/730.2 |
| 8,096,574 B2* | 1/2012 | Okimoto | B60R 21/213 280/728.2 |
| 8,573,638 B2* | 11/2013 | Hayashi | B60R 21/214 280/730.2 |
| 8,651,516 B2* | 2/2014 | Kim | B60R 21/232 280/730.2 |
| 8,876,150 B2* | 11/2014 | Min | B60R 21/213 280/728.2 |
| 8,955,874 B2* | 2/2015 | Kim | B60R 21/213 280/730.1 |
| 9,139,151 B2* | 9/2015 | Beppu | B60R 21/215 |
| 9,487,175 B2* | 11/2016 | Noma | B60R 21/237 |
| 9,539,974 B2* | 1/2017 | Fukuda | B60R 21/201 |
| 9,539,976 B2* | 1/2017 | Jinnai | B60R 21/201 |
| 9,555,761 B2* | 1/2017 | Gilles | B60R 21/201 |
| 9,855,911 B2* | 1/2018 | Konaka | B60R 21/215 |
| 10,106,120 B2* | 10/2018 | Konaka | B60R 21/213 |
| 10,150,443 B2* | 12/2018 | Kallidis | B60R 21/23138 |
| 10,596,990 B2* | 3/2020 | Sato | B60R 21/201 |
| 10,661,745 B2* | 5/2020 | Kakimoto | B60R 21/23138 |
| 10,974,682 B2* | 4/2021 | Iwata | B60R 21/213 |
| 2005/0057023 A1* | 3/2005 | Burton | B60R 21/232 280/730.2 |
| 2005/0206135 A1* | 9/2005 | Nelson | B60R 21/232 280/728.2 |
| 2009/0102166 A1* | 4/2009 | Brown | B60R 21/201 280/728.2 |
| 2011/0248484 A1* | 10/2011 | Scott | B60R 21/213 280/730.2 |
| 2013/0113192 A1* | 5/2013 | Richards | B60R 21/213 280/730.2 |
| 2018/0111579 A1* | 4/2018 | Shimizu | B60R 21/201 |
| 2019/0299907 A1 | 10/2019 | Jinnai et al. | |
| 2020/0079314 A1* | 3/2020 | Zawisa | B60R 21/232 |
| 2021/0221320 A1* | 7/2021 | Steinbach | B60R 21/213 |

FOREIGN PATENT DOCUMENTS

| | | |
|---|---|---|
| JP | 2015016732 A * | 1/2015 |
| JP | 2015016764 A * | 1/2015 |
| JP | 2015-123763 A | 7/2015 |
| JP | 2017149390 A * | 8/2017 |
| JP | 2019-177750 A | 10/2019 |

* cited by examiner

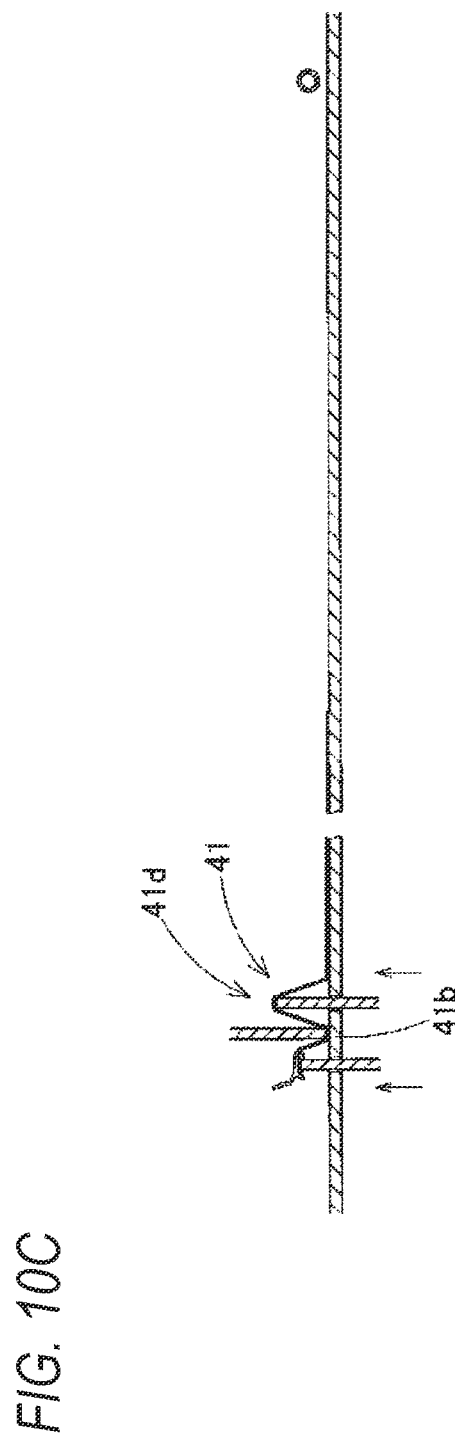

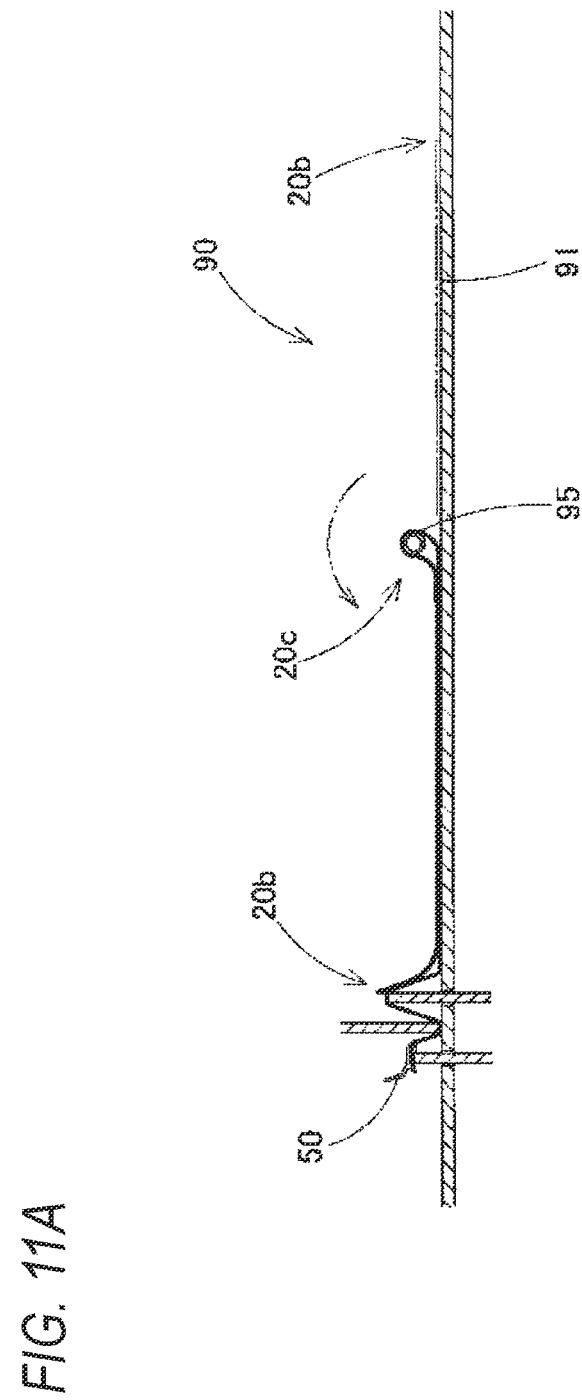

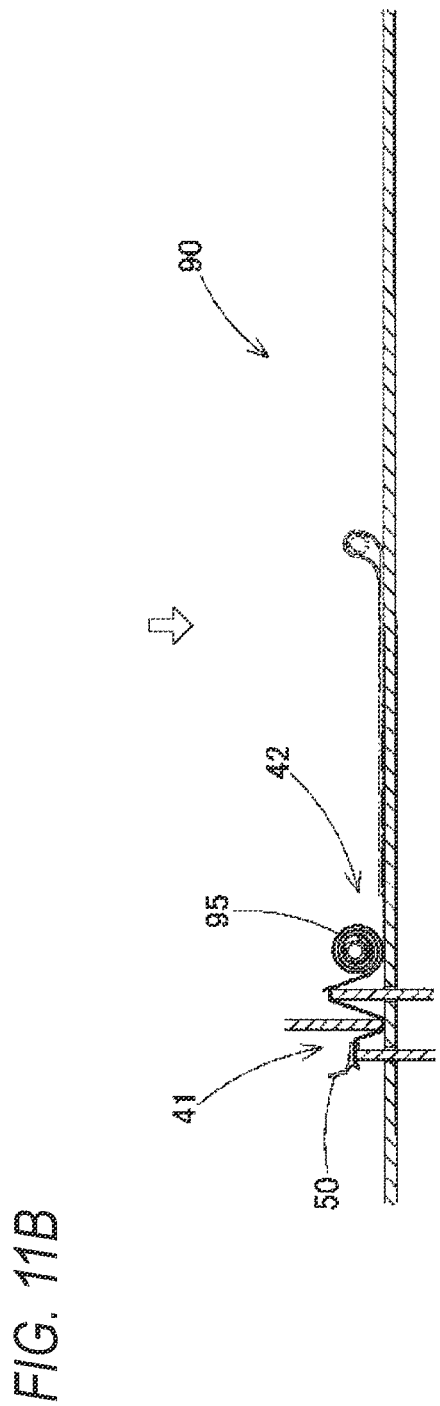

HEAD PORTION PROTECTION AIRBAG DEVICE

CROSS-REFERENCE TO RELATED APPLICATION(S)

This application is based upon and claims the benefit of priority from prior Japanese patent application No. 2020-022803 filed on Feb. 13, 2020, the entire contents of which are incorporated herein by reference.

BACKGROUND

1. Field of the Invention

The present invention relates to a head portion protection airbag device including an airbag that is folded and stored on an upper edge side of a window of a vehicle, and can be unfolded and inflated to cover the window when inflation gas flows in.

2. Description of the Related Art

In related art, in a head portion protection airbag device, an air bag attached to an upper edge side of a window of a vehicle is configured to be unfolded and inflated so as to cover the window when inflation gas flows in (see, for example, JP-A-2019-177750). The airbag is formed into a folded body which is folded such that a lower edge side in an unfolded state approaches an upper edge side, assembled with a twisting restriction member on an upper edge side of the folded airbag, further wrapped with an unfoldment preventing tape material (wrapping material), stored in a case and then attached to the upper edge side of the window together with the case. The twisting restriction member has a configuration in which assembly portions at two ends are connected by a connecting portion, and the assembly portions at the two ends each include an attachment pin that is attached to an attachment location of the case through each insertion hole provided in the upper edge side of the airbag. The twisting restriction member is configured to connect case clearance by the connecting portion that connects the assembly portions at the two ends so as to allow bending of the case clearance and thus prevent twisting of the case clearance.

However, the twisting restriction member in the related art is configured to restrict the twisting of the case clearance where the folded body of the airbag is stored, and is not configured to restrict twisting of the folded body of the airbag itself. Moreover, the twisting is restricted by a plate thickness and a width dimension of the belt-shaped connecting portion, and thus it is difficult to exhibit a sufficient twisting restriction effect.

SUMMARY

The present invention solves the above-described problem, and an object thereof is to provide a head portion protection airbag device capable of accurately restricting the twisting of the folded body of the airbag itself and attaching the folded body to the upper edge side of the window.

According to an aspect of the present invention, there is provided a head portion protection airbag device including: an airbag, which is attached to an upper edge side of a window of a vehicle and is configured to be unfolded and inflated so as to cover the window when inflation gas flows in, wherein: the air bag is: formed into a folded body which is folded such that a lower edge side in an unfolded state approaches an upper edge side; wrapped with an unfoldment preventing tape material and attached to the upper edge side of the window; assembled with a twisting restriction member, which is configured to prevent twisting of the folded body, on an upper edge side of the airbag; and attached to the upper edge side of the window as a bag attachment body; a plurality of attachment piece portions, which are attached to a body side of the vehicle, are arranged side by side on the upper edge side of the airbag; the twisting restriction member includes: a belt-shaped body portion whose length dimension exceeds the plurality of attachment piece portions; and a rib which is arranged on an outer surface side of the body portion and protrudes along a longitudinal direction of the body portion; and the bag attachment body is wrapped with the tape material in a state where the twisting restriction member is assembled to the upper edge side of the airbag in the folded body.

In the head portion protection airbag device according to the present invention, the bag attachment body is formed by wrapping the tape material together with the folded body of the airbag in a state where the twisting restriction member is assembled to the upper edge side of the airbag. The twisting restriction member includes the belt-shaped body portion whose length dimension exceeds the plurality of attachment piece portions of the airbag, and the rib that protrudes along the longitudinal direction of the body portion is arranged on the outer surface side of the body portion. Therefore, a resistance force against the twisting is increased by the rib that protrudes from the body portion of the twisting restriction member, and thus the bag attachment body (folded body) in which the twisting restriction member is assembled in a manner of straddling the plurality of attachment piece portions of the airbag can exhibit a sufficient twisting prevention effect. Further, the twisting restriction member is integrally assembled with the folded body by the tape material configured to prevent unfoldment of the folded body of the airbag, and is arranged to straddle the plurality of attachment piece portions of the airbag, so that the folded body is not stored in a case as in the related art, and it is also possible to prevent occurrence of twisting that causes erroneous assembly, and to directly attach the folded body itself, where the twisting restriction member is assembled, to the body side of the vehicle as the bag attachment body.

Therefore, the head portion protection airbag device according to the present invention can accurately restrict the twisting of the folded body of the airbag itself and attach the folded body to the upper edge side of the window.

In the head portion protection airbag device according to the present invention, the folded body formed by folding the airbag may have a substantially cylindrical shape, the body portion may have a curved cross-sectional shape which corresponds to an outer peripheral surface of the folded body, and the rib may be a ridge along the longitudinal direction of the body portion, and may be protruded from the body portion in a radial direction from a center of the folded body.

With such a configuration, even when the folded body is twisted in a clockwise direction or a counterclockwise direction with respect to a cross-sectional center thereof, the rib can exert equivalent twisting resistance forces in both directions, so that the twisting of the folded body can be accurately restricted without being limited by directions of the twisting.

In the head portion protection airbag device according to the present invention, the twisting restriction member may include a positioning portion enabled to be assembled to a plurality of positioning locations provided on the upper edge side of the airbag, and the twisting restriction member may be enabled to be assembled to the upper edge side of the airbag before folding.

With such a configuration, the folded body where the twisting restriction member is assembled, in other words, the bag attachment body to be attached to the vehicle can be easily obtained by assembling the positioning portion to the positioning location on the upper edge side of the airbag before the folding, arranging the twisting restriction member on the upper edge side of the airbag and then forming the folded body obtained by folding the airbag by a folding process of simply bringing the lower edge side of the airbag itself close to the upper edge side, and subsequently wrapping the tape material. That is, the bag attachment body that can be attached to the vehicle can be formed by simply assembling the twisting restriction member in advance to the upper edge side of the airbag and then performing a normal folding process of the airbag and a wrapping process of the tape material, so that the bag attachment body can be formed without consuming much time and effort as compared with, for example, a case where the assembly of the twisting restriction member and the wrapping of the tape material are performed with respect to the folded body after the folding.

In the head portion protection airbag device according to the present invention, the twisting restriction member may include an attachment plate portion which is superimposed with the attachment piece portion and attached to the body together with the attachment piece portion.

With such a configuration, alignment of the folded body with respect to the body side and an orientation from the cross-sectional center (peripheral direction arrangement position) can be defined by using the attachment plate portion attached to the body side, so that the bag attachment body in which the twisting restriction member is assembled to the folded body can be attached to the body side at a predetermined position in a predetermined posture.

Further, if the twisting restriction member includes an assembly portion that can be assembled to a positioning assembly location provided on the body side, the alignment of the folded body with respect to the body side and the orientation from the cross-sectional center (peripheral direction arrangement position) can be defined in the same manner as described above by using the assembly portion, so that the bag attachment body in which the twisting restriction member is assembled to the folded body can be attached to the body side at the predetermined position in the predetermined posture.

In the head portion protection airbag device according to the present invention, the twisting restriction member may include, at a terminal of the body portion, an attachment portion attached to a component of the head portion protection airbag device or the body side.

With such a configuration, if the twisting restriction member includes, at the terminal, the attachment portion that is attached to the component of the head portion protection airbag device or the body side, the attachment portion of the terminal can be attached to the corresponding component of the head portion protection airbag device or the body side even when the attachment piece portion of the airbag is not provided on the terminal portion, and thus the folded body near the terminal can be arranged at the predetermined position in the predetermined posture.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 10A to 10C are explanatory diagrams showing a folding process that forms the bag attachment body of the embodiment;

FIGS. 11A and 11B are explanatory diagrams showing the folding process that forms the bag attachment body of the embodiment, showing a process after the process shown in FIGS. 10A to 10C;

DETAILED DESCRIPTION OF THE INVENTION

Figure 1:
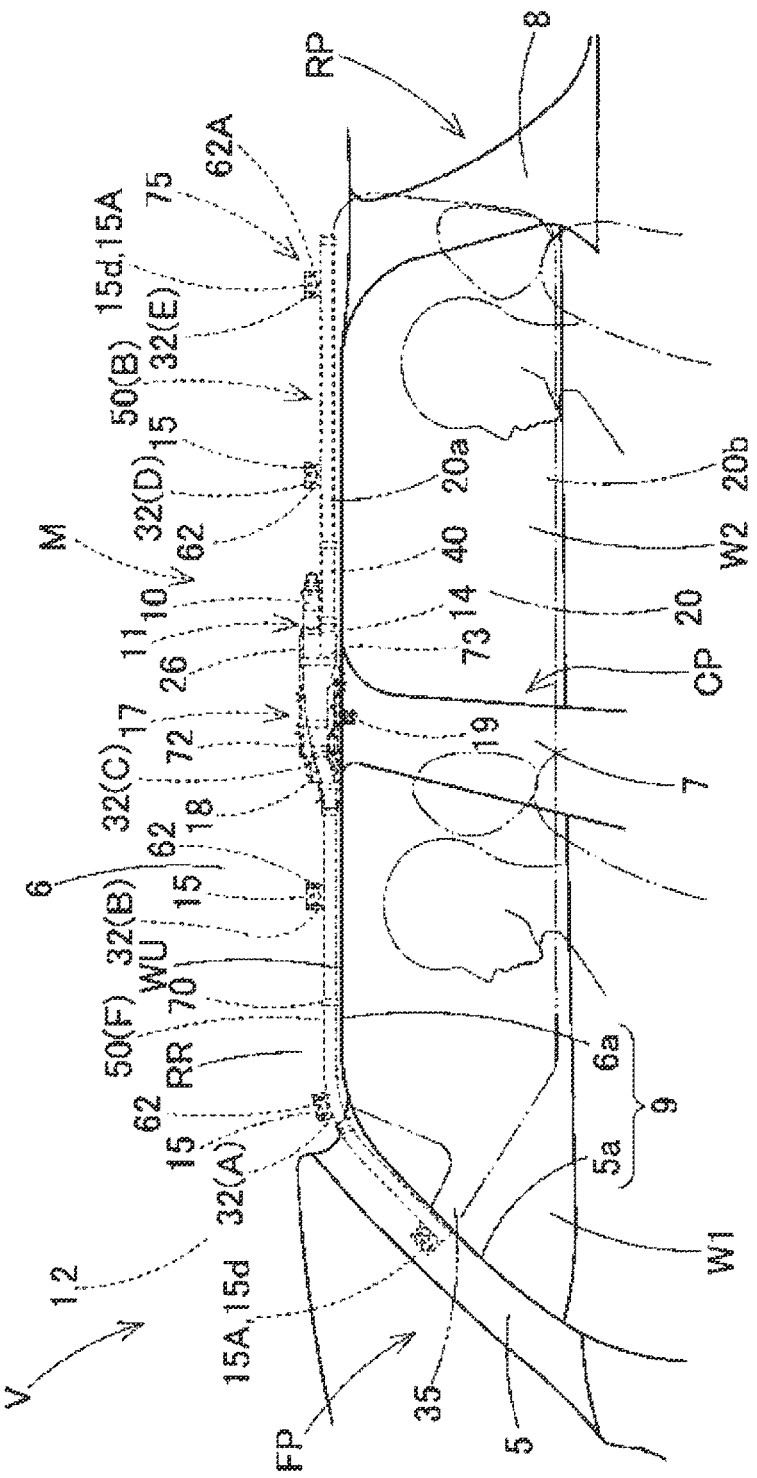
FIG. 1 is a front view of a vehicle-mounted state of a head portion protection airbag device according to an embodiment of the present invention as viewed from a vehicle inner side.
Figure 2:
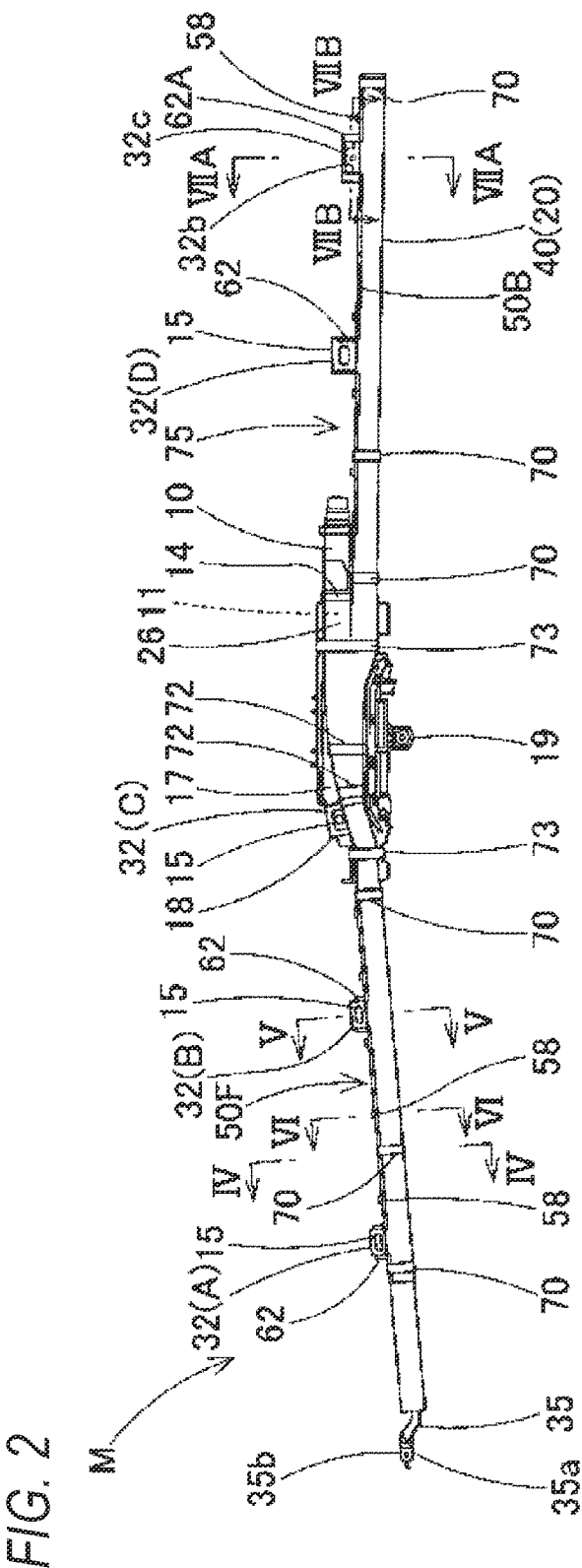
FIG. 2 is a schematic front view showing the head portion protection airbag device of the embodiment.
Figure 3:
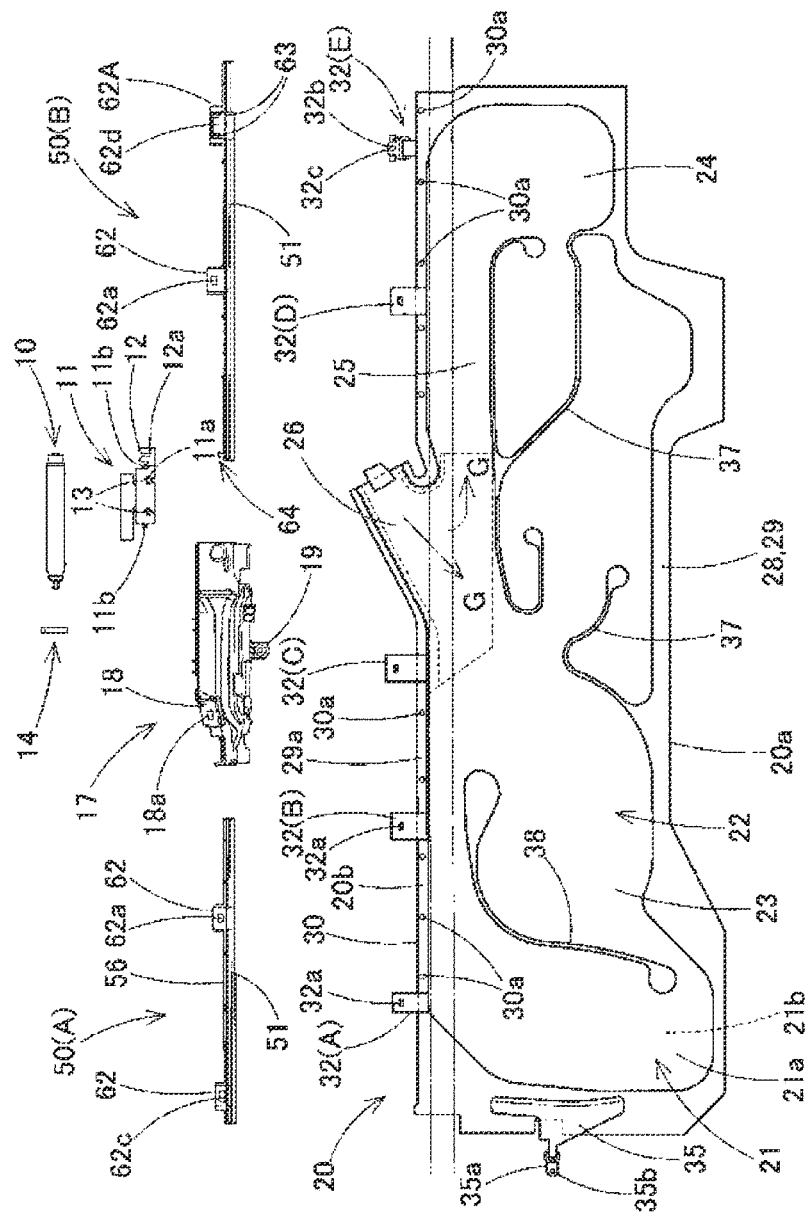
FIG. 3 is a schematic exploded front view of the head portion protection airbag device of the embodiment.

Hereinafter, an embodiment of the present invention will be described with reference to the drawings. As shown in FIGS. 1 to 3, according to a head portion protection airbag device M of the embodiment, an airbag 20 is folded and stored in a peripheral edge on the side of an upper edge WU of windows (side windows) W1 and W2 of a vehicle V, that is, in a range that extends from a front pillar portion FP to the vicinity above a rear pillar portion RP via a roof side rail portion RR, in a manner that allows the windows W1 and W2 to be covered when unfoldment and inflation of the airbag 20 are completed. In the vehicle V, one intermediate pillar portion CP is provided substantially along an up-down direction between the front pillar portion FP and the rear pillar portion RP. The airbag 20 is configured to cover the windows W1 and W2 together with vehicle inner sides of portions of an intermediate pillar garnish 7 of the intermediate pillar portion CP and a rear pillar garnish 8 of the rear pillar portion RP when the unfoldment and the inflation are completed.

As shown in FIGS. 1 to 3, the head portion protection airbag device M includes the airbag 20, an inflator 10 that supplies inflation gas to the airbag 20, an attachment bracket 11 that attaches the inflator 10 to a body 1 of the vehicle V, and twisting restriction members 50 (F, B) that prevent twisting of the folded airbag 20. Further, in the case of the embodiment, the airbag device M includes a synthetic resin cover 17 that covers a vehicle outer side of the airbag 20 (in the vicinity of a connection port portion 26 to be described later below) in the vicinity of the inflator 10. In the airbag device M, the airbag 20 is formed as a folded body 40 which is folded, assembled with the twisting restriction members 50 (F, B), and further wrapped with a tape material 70 so as to prevent unfoldment of the folded body 40 such that a bag attachment body 75 is formed and attached to the side of the upper edge WU of the windows W1 and W2. The tape material 70 is broken when the airbag 20 is inflated.

In the case of the embodiment, when the bag attachment body 75 is to be mounted on the vehicle V as the airbag device M, the bag attachment body 75 is assembled with the cover 17 that covers the vicinity of the connection port portion 26 and assembled with the inflator 10 where the attachment bracket 11 is attached such that the bag attachment body 75 is assembled as the airbag device M. Then the attachment bracket 11, an attachment bracket portion 19 of the cover 17, and each attachment piece portion 32 of the airbag 20 are attached to the body 1 such that the bag attachment body 75 is mounted on the vehicle.

When the airbag device M is mounted to the vehicle V, a vehicle inner side thereof is covered by an airbag cover 9 and stored therein. In the case of the embodiment, the airbag cover 9 is constituted by a lower edge 5a of a front pillar garnish 5 that covers a vehicle inner side of the front pillar portion FP, and a lower edge 6a of a roof head lining 6 that covers a vehicle inner side of the roof side rail portion RR.

The front pillar garnish 5 and the roof head lining 6, together with the intermediate pillar garnish 7 and the rear pillar garnish 8, are made of synthetic resin and attached, by an attachment unit (not shown), to a vehicle inner side of an inner panel 2, which is a member located on the side of the body 1 of the front pillar portion FP and the roof side rail portion RR. The airbag cover 9 constituted by the lower edges 5a and 6a is pressed against the airbag 20 in a manner that allows the airbag 20 to protrude during unfoldment and inflation, and the lower edges 5a and 6a are opened to the vehicle inner side.

The inflator 10 has a substantially cylindrical shape, and a gas discharge port (not shown) capable of discharging the inflation gas is provided on a tip end (front end) side of the inflator 10. The vicinity of the tip end of the inflator 10 including the vicinity of the gas discharge port is inserted into the connection port portion 26 of the airbag 20, and the inflator 10 is connected to the connection port portion 26 of the airbag 20 through using a clamp 14 that is externally provided in the vicinity of a rear end of the connection port portion 26. The inflator 10 is attached to the inner panel 2 through using the attachment bracket 11 that holds the inflator 10 and an attachment bolt 13 that is configured to fix the attachment bracket 11 to the inner panel 2 on the side of the body 1.

Figure 12:
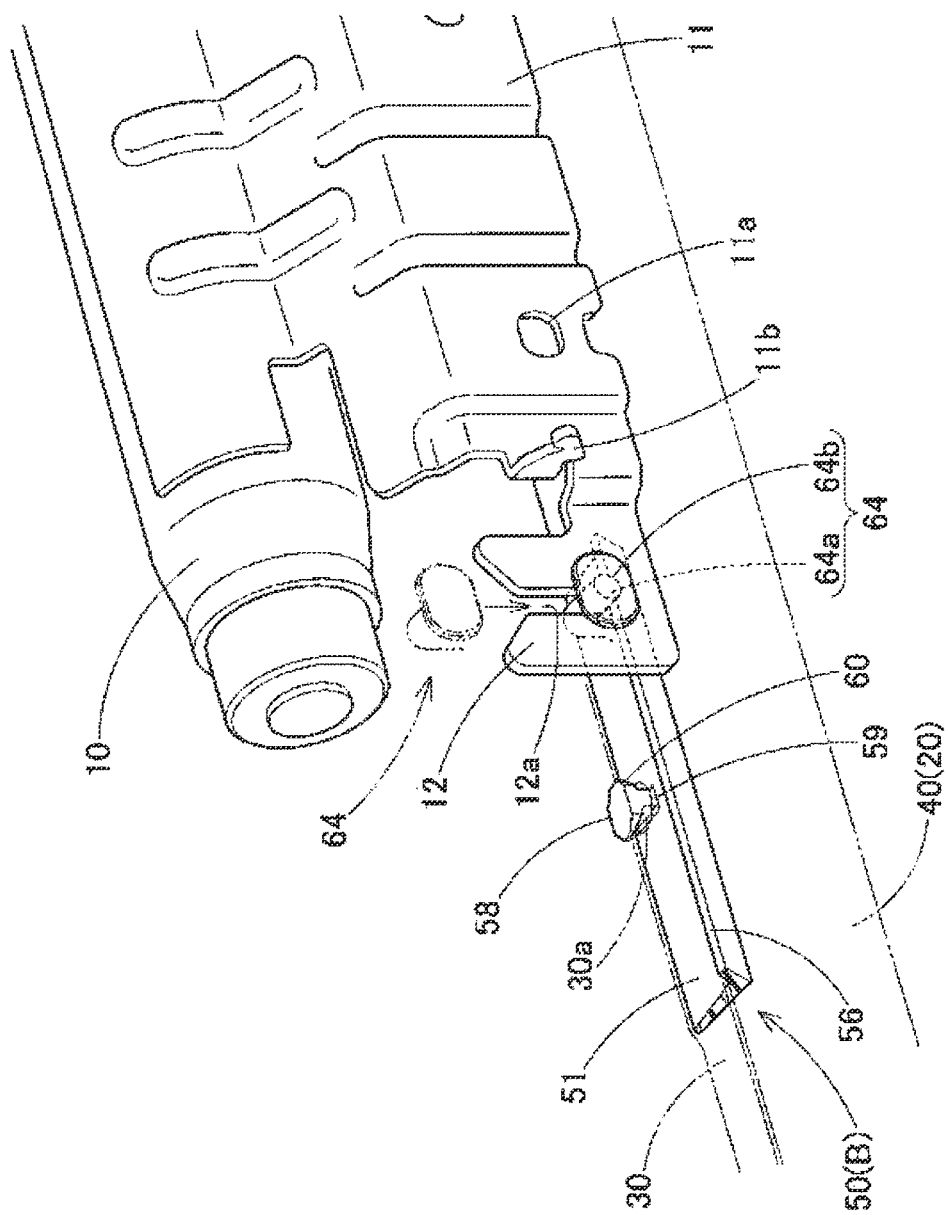
FIG. 12 is a schematic perspective view showing a state where an attachment portion of the bag attachment body of the embodiment is attached to an attachment portion of an attachment bracket.

The attachment bracket 11 includes an attachment hole 11a through which the attachment bolt 13 is passed, and a hook 11b that is locked by a locking hole (not shown) of the inner panel 2 of the body 1 and temporarily fastened therein. The attachment bracket 11 further includes an attachment portion 12 including a locking recessed portion 12a where a locking hook (attachment portion) 64 provided on a terminal (front end) of the twisting restriction member 50B is connected (see FIGS. 3 and 12).

As shown in FIG. 3, the airbag 20 is a portion that is unfolded and inflated due to an inflow of inflation gas G so as to cover the windows W1 and W2. The airbag 20 includes a gas inflow portion 21 that is inflated due to the inflow of the inflation gas G such that a vehicle inner side wall portion 21a and a vehicle outer side wall portion 21b are separated from each other, and a non-inflow portion 28 (where the inflation gas G does not flow) that is formed to connect the vehicle inner side wall portion 21a and the vehicle outer side wall portion 21b. The gas inflow portion 21 includes a protective inflation portion 22, a gas supply path portion 25, and the connection port portion 26. The non-inflow portion 28 includes a peripheral edge portion 29, attachment piece portions 32, and closing portions 37 and 38.

The protective inflation portion 22 of the gas inflow portion 21 includes a front protection portion 23 that covers the window W1 beside a front seat and a rear protection portion 24 that covers the window W2 beside a rear seat when the unfoldment and the inflation of the airbag 20 are completed. The gas supply path portion 25 extends from the connection port portion 26, which is located in the vicinity of a front-rear direction center on the side of an upper edge 20a of the airbag 20, toward front and rear sides, and is capable of supply the inflation gas G from the connection port portion 26 to the front protection portion 23 and the rear protection portion 24. The connection port portion 26 is provided in a manner that allows the inflation gas G from the inflator 10 to be introduced into the protective inflation portion 22.

An inner tube (reference numeral omitted in the drawings) configured to improve heat resistance is provided in the connection port portion 26.

Figure 7A:
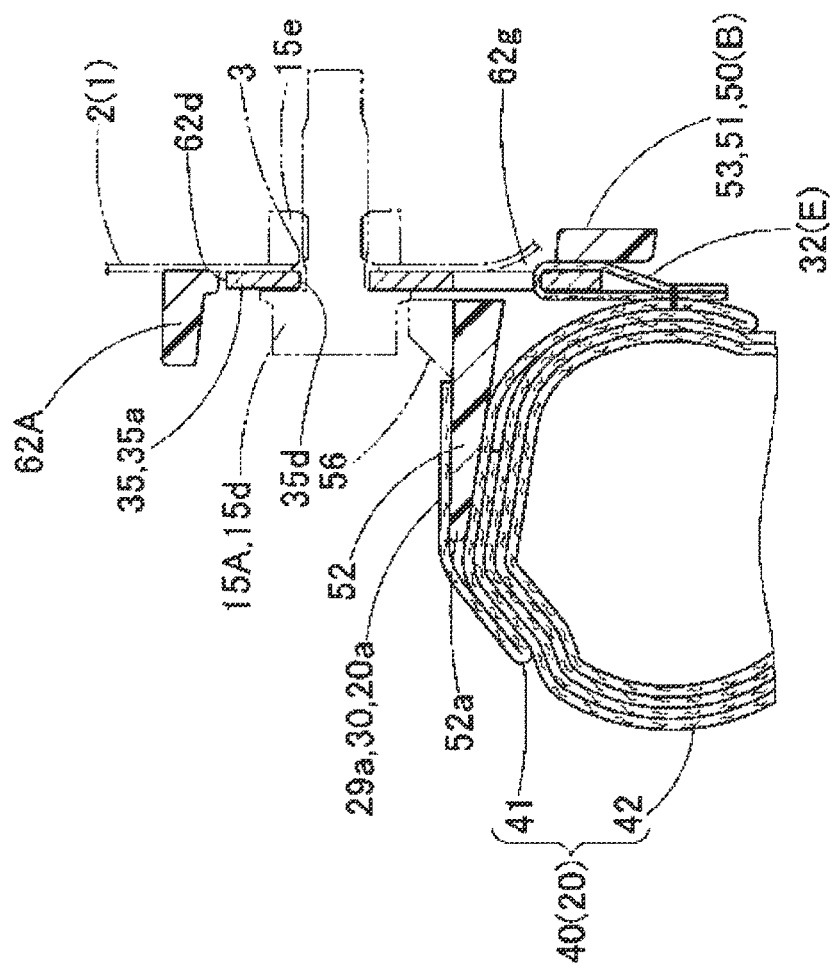
FIGS. 7A and 7B are cross-sectional views of the bag attachment body of the embodiment, showing portion VIIA-VIIA and portion VIM-VIM of FIG. 2.
Figure 7B:
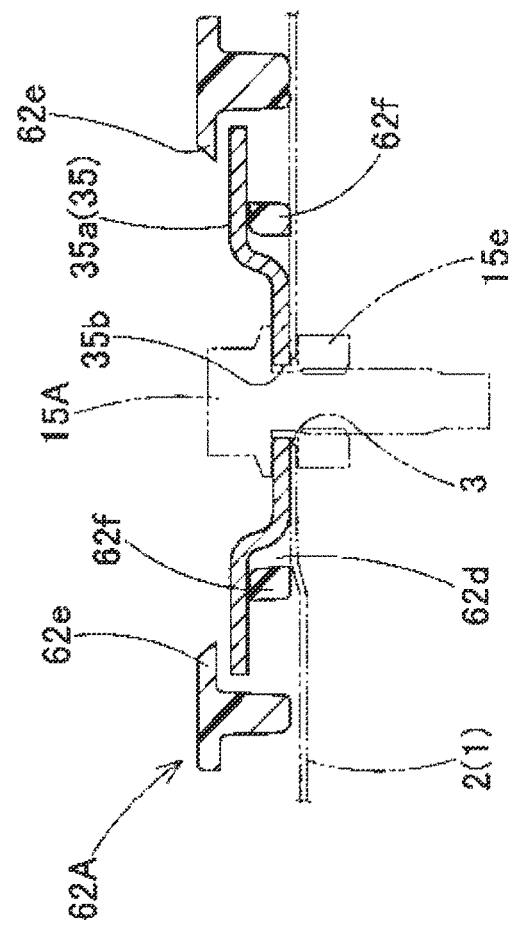

The peripheral edge portion 29 of the non-inflow portion 28 is provided on an outer peripheral edge of the gas inflow portion 21. The attachment piece portions 32 (A, B, C, D, E) attached to the inner panel 2 on the side of the body 1 of the roof side rail portion RR are arranged on the side of an upper edge 29a by attachment tools 15 and 15A. An attachment belt portion 35 to be attached to the inner panel 2 on the side of the body 1 of the front pillar portion FP is arranged on a front edge side by the attachment tool 15A (bolt). The attachment piece portions 32 (A, B, C, D) are separately attached to a vehicle inner side of the upper edge 20a of the airbag 20 by sewing or the like (see FIG. 5). The attachment piece portion 32E located at a rear end is attached to a vehicle outer side on the side of the upper edge 20a by sewing or the like (see FIGS. 7A and 7B).

The closing portion 37 of the non-inflow portion 28 enters the protective inflation portion 22 from the peripheral edge portion 29. The closing portion 38 is provided in a region of the front protection portion 23.

Each attachment piece portion 32 (A to D) is formed with an attachment hole 32a in which the attachment tool 15 (resin clip) to be fastened to an attachment hole 3 of the inner panel 2 is inserted. An attachment seat 32b made of sheet metal is connected to a tip end of the attachment piece portion 32E. An attachment hole 32c in which the attachment tool 15A (bolt) is inserted is formed in the attachment seat 32b (see FIGS. 3, 7A and 7B). A plate-shaped attachment seat 35a made of sheet metal is also connected to a tip end of the attachment belt portion 35, and an attachment hole 35b in which the attachment tool 15A (bolt) is inserted is formed in the attachment seat 35a.

Figure 5:
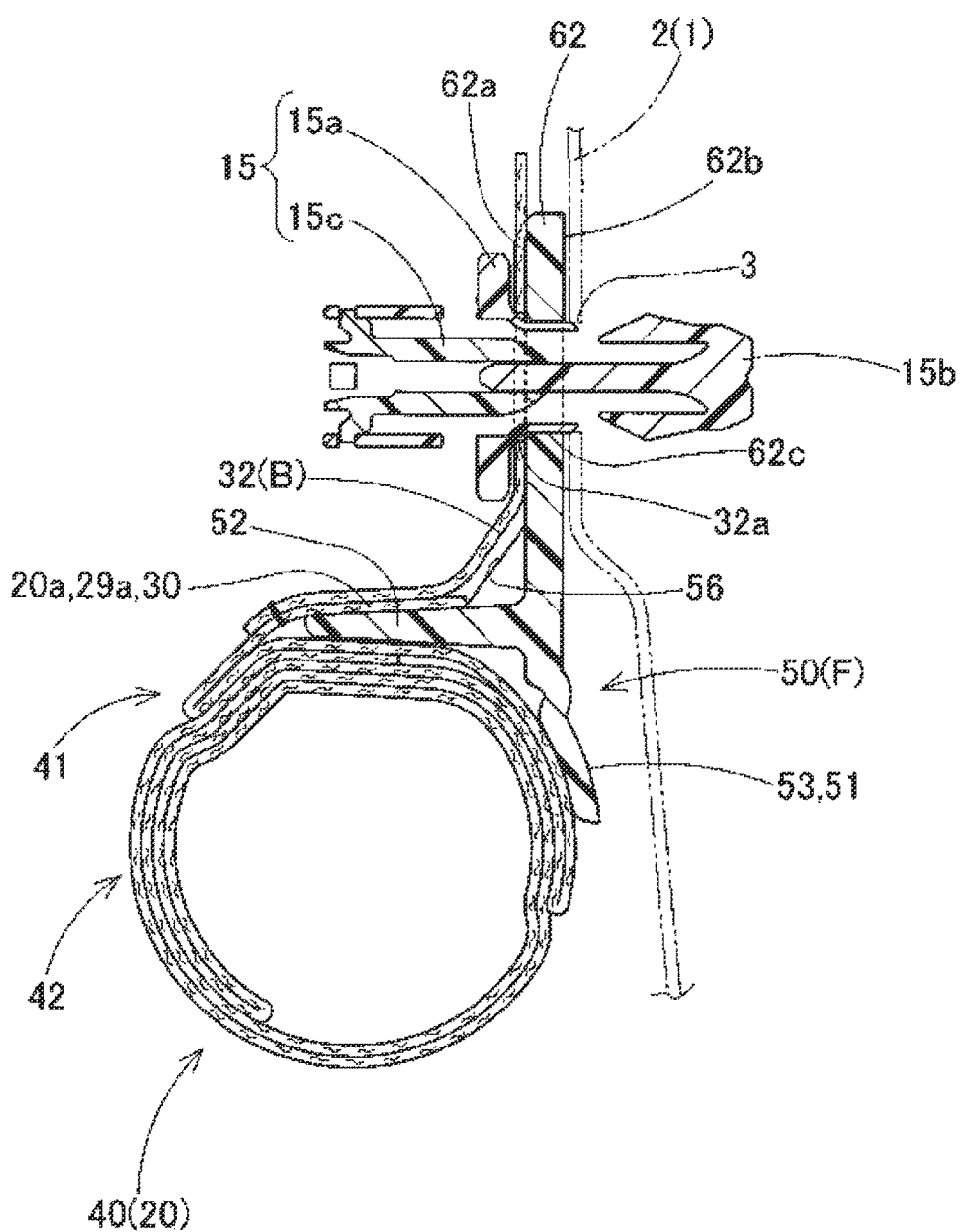
FIG. 5 is a cross-sectional view of the bag attachment body of the embodiment, which shows portion V-V of FIG. 2.

Each attachment tool 15 formed of the resin clip includes a pressing plate portion 15a that protrudes a locking leg portion 15b, and an expansion portion 15c that expands a tip end side of the locking leg portion 15b at the time of insertion such that the locking leg portion 15b is locked to a peripheral edge of the attachment hole 3 on the side of the body 1 (see FIG. 5). The locking leg portion 15b before expansion can be inserted into an attachment hole 62c or 18a of an attachment plate portion 62 or 18 to be described later below and thus can be temporarily locked to a peripheral edge. The attachment plate portion 18 is a portion provided on the cover 17.

A positioning location 30 where positioning holes 30a are provided is provided on the side of the upper edge 29a of the peripheral edge portion 29 of the airbag 20 in such a manner that allows each twisting restriction member 50 (F, B) to be assembled at a predetermined position. The positioning location 30 is a portion on the side of the upper edge 29a of the peripheral edge portion 29 which is exposed when the airbag 20 is folded, and the positioning holes 30a that are opened in circular shapes penetrate 10 places along the front-rear direction (see FIG. 3).

Figure 9:
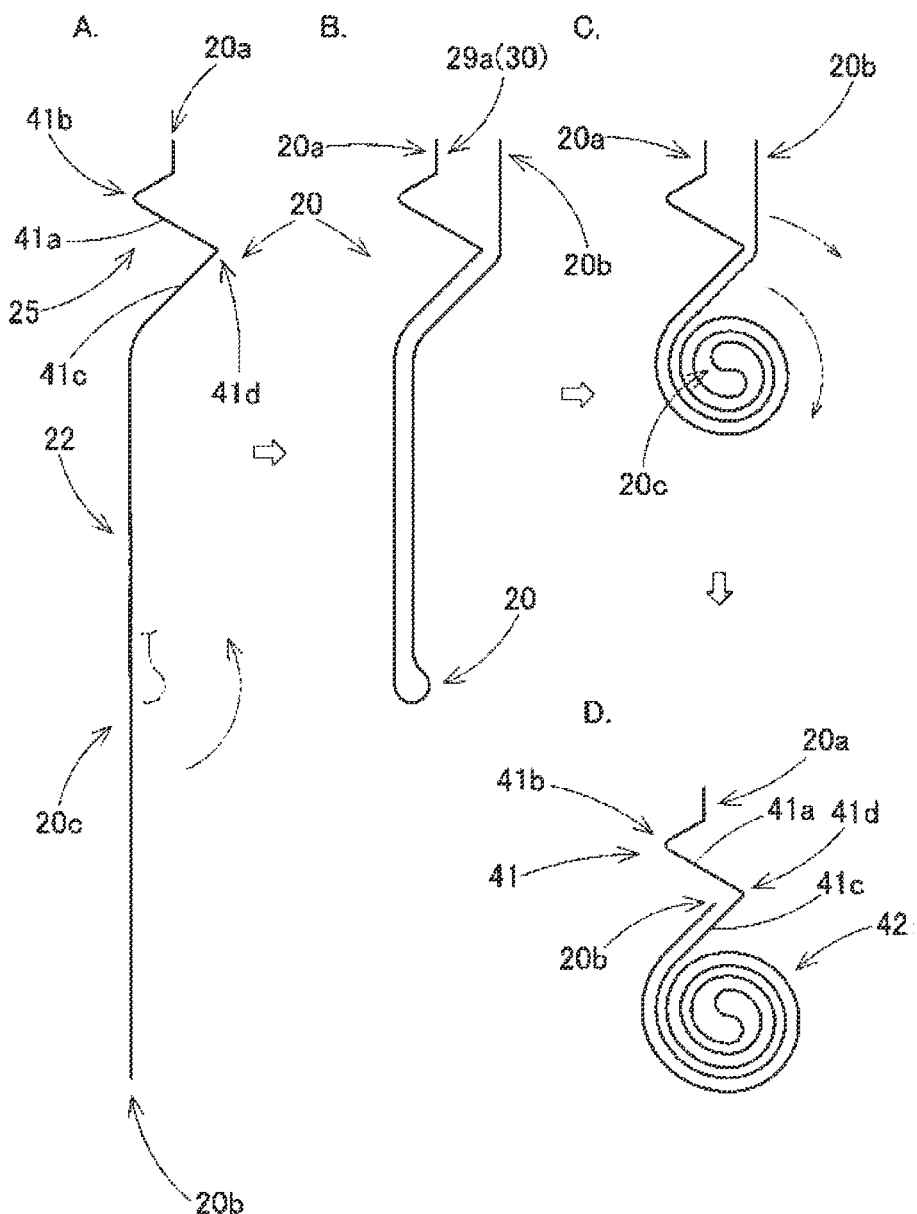
FIG. 9 is an explanatory diagram showing a folded state of an airbag of the embodiment.

As shown in Sections A to D of FIG. 9, the airbag 20 is folded into the folded body 40 by roll-folding in such a manner that the side of a lower edge 20b is brought close to the upper edge 20a in a flatly unfolded state. Specifically, in the vicinity of the gas supply path portion 25, a bellows-folded portion 41 is obtained by making folds 41b and 41d along the front-rear direction and performing bellows-folding such that a first layer 41a and a second layer 41c overlap each other. A region of the protective inflation portion 22 below the bellows-folded portion 41 is made into a roll-folded portion 42 obtained by roll-folding. More specifically, the roll-folded portion 42 is formed by performing roll-folding such that the side of a lower edge (an up-down direction intermediate portion of the flatly unfolded airbag 20) 20c is brought close to the upper edge 20a in a two-folded state where the lower edge 20b is brought close to the upper edge 20a.

When the folded body 40 is formed by folding the airbag 20 of the embodiment, as will be described later below, a bag folding machine 90 shown in FIGS. 10A to 11B is used. The folded body 40 has a substantially cylindrical shape.

As shown in FIGS. 4 to 8B, each twisting restriction members 50 (F, B) is made of synthetic resin such as a polyolefin-based thermoplastic elastomer, and includes a belt-shaped body portion 51 whose length dimension exceeds the plurality of attachment piece portions 32 of the airbag 20, and a rib 56 provided on the side of an outer surface 51a of the body portion 51 so as to protrude along a longitudinal direction of the body portion 51. The twisting restriction member 50F is provided on a front portion side of the airbag 20 and is provided to straddle the two attachment piece portions 32A and 32B (see FIG. 2). The twisting restriction member 50B is provided on a rear portion side of the airbag 20 and is provided to straddle the two attachment piece portions 32D and 32E. That is, the twisting restriction members 32F and 32B are provided in front of and behind the folded body 40 with the cover 17, which covers the vicinity of the connection port portion 26 and the inflator 10, interposed therebetween.

Figure 4:
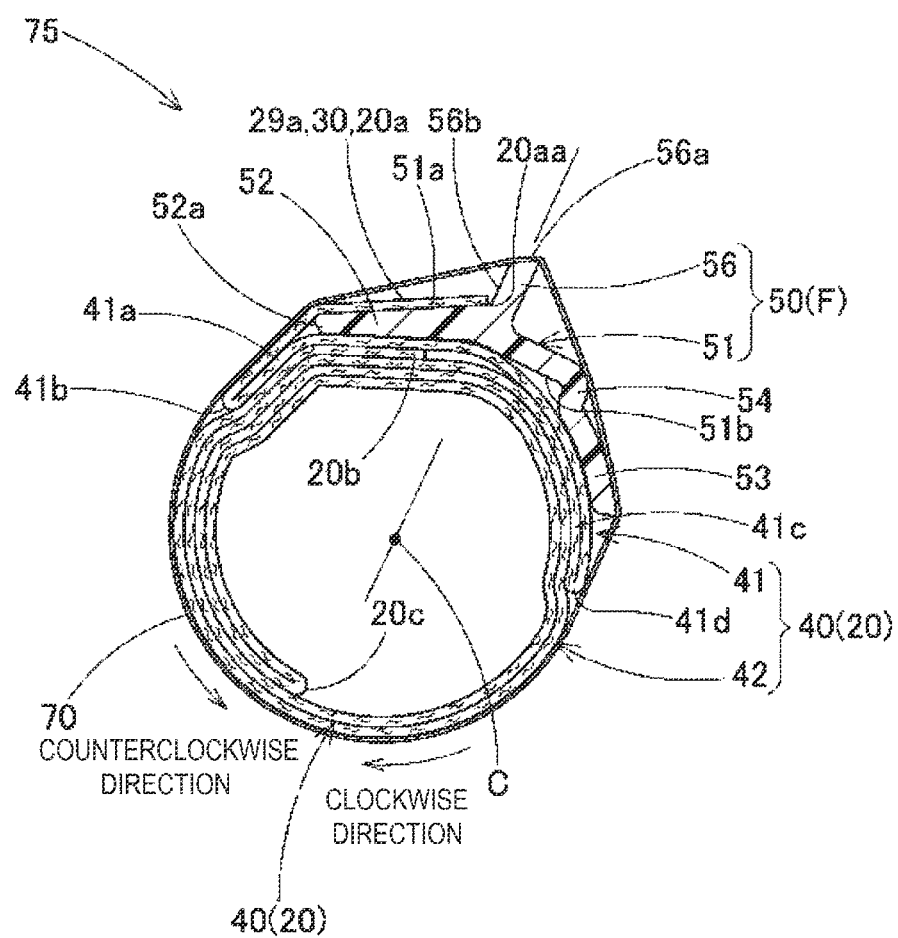
FIG. 4 is a cross-sectional view of a bag attachment body of the embodiment, which shows portion IV-IV of FIG. 2.
Figure 8A:
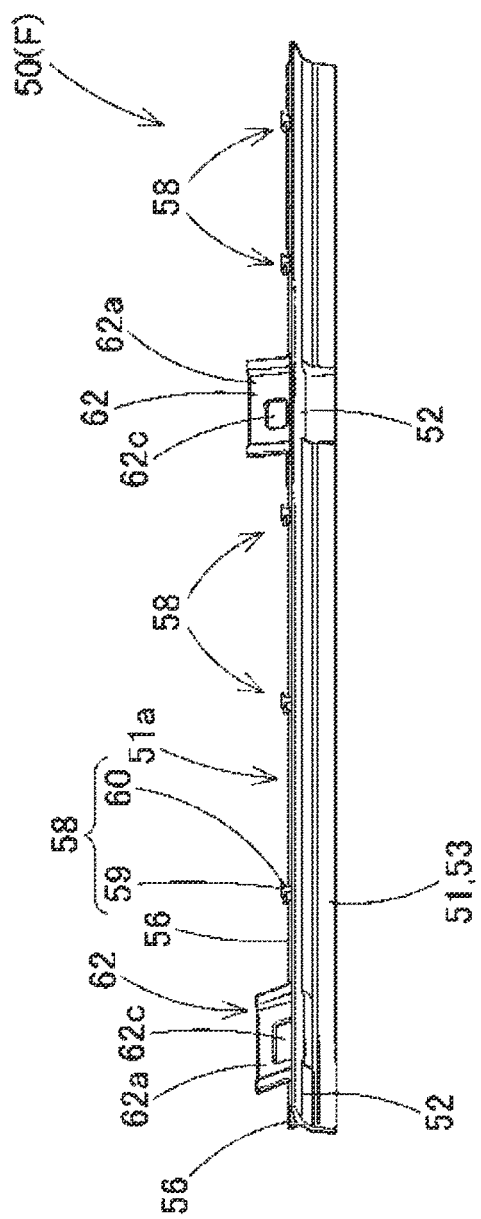
FIGS. 8A and 8B are schematic perspective views of each twisting restriction member of the embodiment.
Figure 8B:
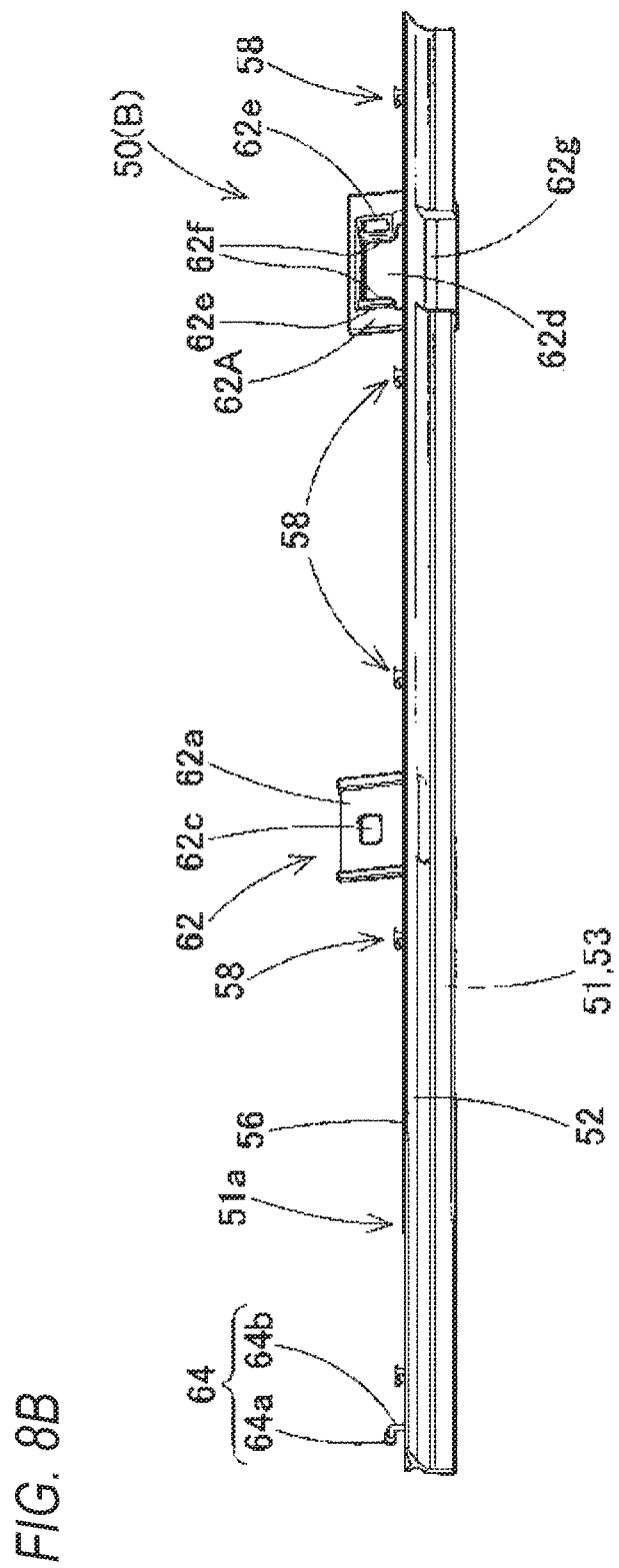

As shown in FIGS. 4, 8A and 8B, the body portion 51 of each twisting restriction member 50 (F, B) has a curved cross-sectional shape that corresponds to an outer peripheral surface of the substantially cylindrical folded body 40. Further, the body portion 51 includes an inner side portion 52 located on the vehicle inner side and an outer side portion 53 located on the vehicle outer side with the rib 56 interposed therebetween. A bent portion 54, which is bent to protrude toward an outer peripheral side along an entire length of the body portion 51, is provided on the side of the outer side portion 53. The inner side portion 52 has a flat plate shape.

The rib 56 is a ridge along the longitudinal direction of the body portion 51, and is protruded from the body portion 51 in a radial direction from a center C of the folded body 40 in a state where the twisting restriction member 50 is assembled while the tape material 70 is wrapped. A thickness dimension of the rib 56 is about 2 mm, which is equal to a thickness dimension of the body portion 51, and an amount of protrusion by which the rib 56 protrudes from the body portion 51 is about ½ of a width dimension of the inner side portion 52. A tip end surface 56a of the rib 56 is parallel to the flat plate-shaped inner side portion 52 of the body portion 51.

Figure 6:
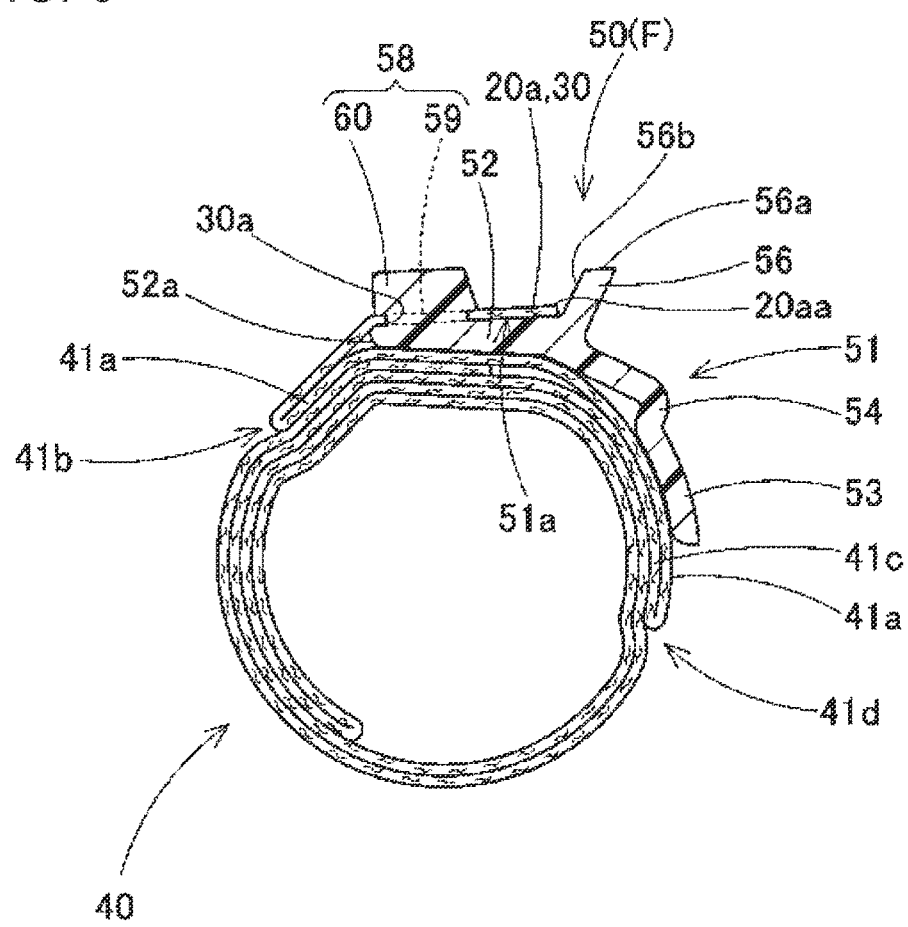
FIG. 6 is a cross-sectional view of the bag attachment body of the embodiment, which shows portion VI-VI of FIG. 2.

Positioning portions 58 that can be assembled to the positioning holes 30a of the positioning location 30 provided on the side of the upper edge 20a of the airbag 20 are provided on the side of the outer surface 51a of the inner side portion 52 of the body portion 51 (see FIGS. 6, 8A and 8B). The positioning portions 58 correspond to the positioning holes 30a of the positioning location 30 of the airbag 20. Five of the positioning portions 58 are provided on the twisting restriction member 50F while five of the positioning portions 58 are provided on the twisting restriction member 50B. Each positioning portion 58 includes a shaft portion 59 that protrudes from the outer surface 51a (upper surface) of the inner side portion 52, and a locking head portion 60 whose diameter at an upper end of the shaft portion 59 is expanded. The positioning portion 58 is inserted into the positioning hole 30a, and is positionally restricted by preventing the locking head portion 60 from coming off a peripheral edge of the positioning hole 30a. The shaft portion 59 protrudes upward from an inner edge (tip end) 52a of the inner side portion 52. The locking head portion 60 is formed by protruding semicircular plate-shaped flange portions from the upper end of the shaft portion 59 toward front and rear sides.

Each twisting restriction member 50 (F, B) can be assembled to the side of the upper edge 20a of the airbag 20 before the airbag 20 is folded. That is, when the inner side portion 52 of the body portion 51 is arranged between a vehicle outer side surface on the side of the upper edge 20a and the first layer 41a of the bellows-folded portion 41, the locking head portion 60 of each positioning portion 58 is inserted from the vehicle outer side to the vehicle inner side of the positioning hole 30a, and the positioning location 30 is arranged on an upper surface side of the inner side portion 52, a tip end 20aa of the upper edge 20a excluding the portion of the attachment piece portion 32 is in contact with an inner side surface 56b of the rib 56.

Each twisting restriction member 50 (F, B) includes attachment plate portions 62 and 62A that are superimposed on the respective attachment piece portions 32 of the airbag 20 and are attached to the body 1 together with the attachment piece portions 32 (see FIGS. 5, and 7A to 8B). Each attachment plate portion 62 protrudes upward from the outer side portion 53 of the body portion 51 in a substantially rectangular plate shape. Each attachment plate portion 62 causes the respective attachment piece portions 32 (A to D), which extend upward from the folded body 40, to abut against a vehicle inner side surface 62a of the attachment plate portion 62, and is formed in such a manner that front and rear edges thereof are loosely connected to the rib 56

(see FIGS. 8A and 8B). The attachment hole 62c, where the locking leg portion 15b protruding from the pressing plate portion 15a of the attachment tool 15 (resin clip) is inserted, penetrates each attachment plate portion 62. The locking leg portion 15b before pushing the expansion portion 15c is temporarily stopped by the peripheral edge of the attachment hole 62c so as to be locked on the attachment plate portion 62.

The attachment plate portion 62A located at a rear end of the twisting restriction member 50B is a portion where the attachment seat 32b attached to the attachment piece portion 32E is attached. The attachment plate portion 62A includes an insertion hole 62d through which a bolt 15d serving as the attachment tool 15A that penetrates the attachment hole 32c of the attachment seat 32b is inserted, and an insertion hole 62g that allows the attachment seat 32b to be inserted therein from below and arranged on a vehicle inner side of the attachment plate portion 62A. The attachment plate portion 62A further includes a locking claw portion 62e on the vehicle inner side and a support piece portion 62f on the vehicle outer side which can sandwich front and rear edges of the attachment seat 32b inserted through the insertion hole 62g. The attachment plate portion 62A is also formed in such a manner that front and rear edges thereof are loosely connected to the rib 56 (see FIGS. 8A and 8B).

Further, an attachment portion 64, which is formed of a locking hook that is locked in the locking recessed portion 12a of the attachment portion 12 provided on the attachment bracket 11 holding the inflator 10, is provided on a front end side of the twisting restriction member 50B (see FIGS. 3, 8A, 8B and 12). The attachment portion 64 includes a shaft portion 64b that is bent from the body portion 51 and extends to the vehicle outer side, and a head portion 64a whose diameter at a tip end of the shaft portion 64b is expanded. The locking hook 64 that serves as the attachment portion is inserted into the locking recessed portion 12a from above such that the head portion 64a is locked by the locking recessed portion 12a.

The twisting restriction members 50 (F, B) are assembled in advance before a folding process of folding the airbag 20. That is, as shown in A of FIG. 10, when the airbag 20 is flatly unfolded on a base 91 of the bag folding machine 90, the locking head portion 60 of each positioning portion 58 of each of the twisting restriction members 50 (F, B) is inserted and locked in the respective positioning hole 30a of the positioning location 30 on the side of the upper edge 20a.

Each of the attachment piece portions 32 (A, B, D) is assembled with the attachment tool 15, and the locking leg portion 15b is inserted through the attachment hole 32a. Further, each of the attachment piece portions 32 (A, B, D) is locked in the attachment hole 62c of the attachment plate portion 62 and temporarily stopped by the corresponding attachment plate portion 62. The attachment seat 32b is inserted through the insertion hole 62g and interposed between the locking claw portion 62e and the support piece portion 62f such that the attachment piece portion 32E is temporarily stopped by the corresponding attachment plate portion 62A.

Figure 10A:
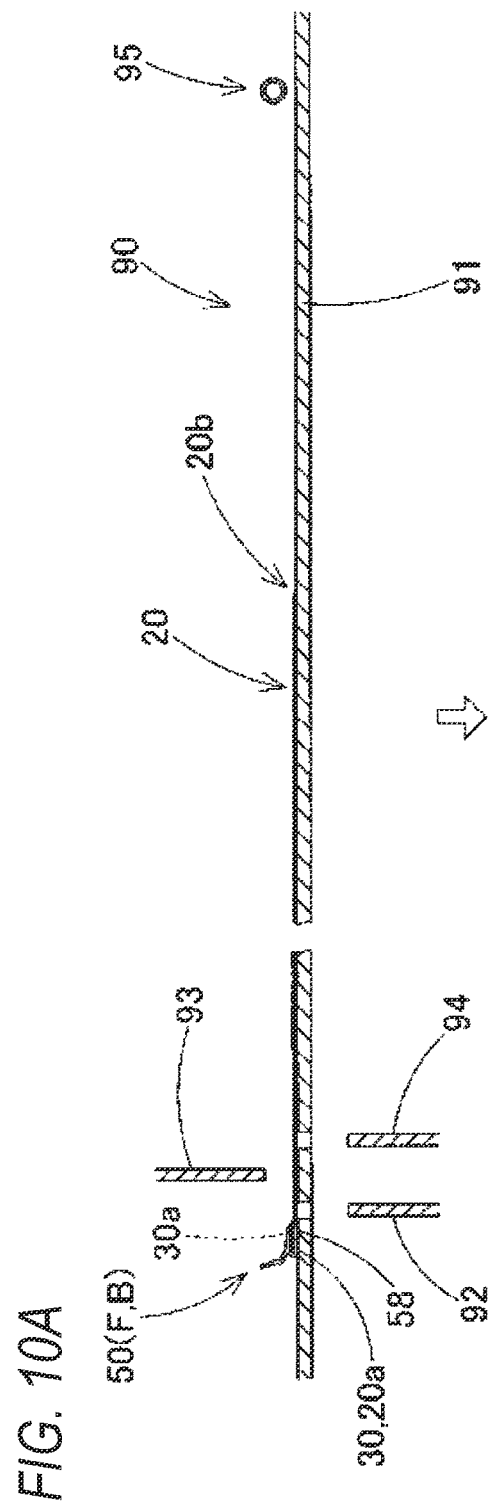
Figure 10B:
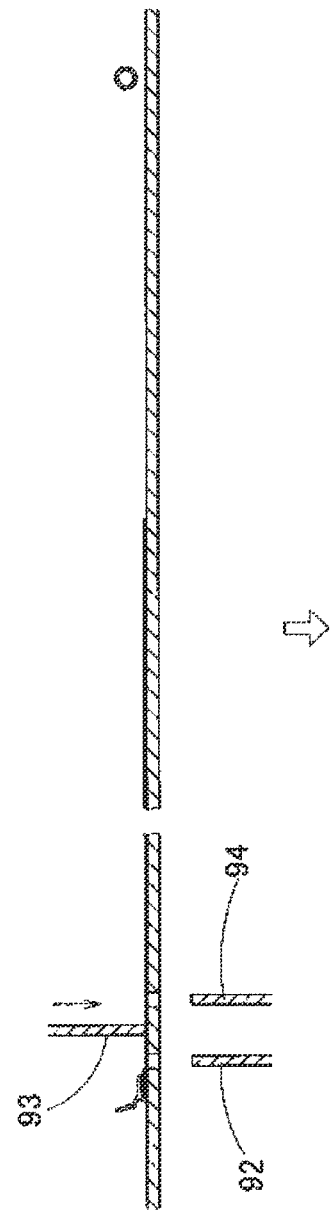

As shown in A to C of FIG. 10, after the airbag 20 assembled with the twisting restriction members 50 (B, F) is unfolded on the base 91 of the bag folding machine 90, folding plates 92, 93, and 94 are moved to form the folds 41b and 41d of the bellows-folded portion 41. Next, as shown in FIG. 11A, a winding bar 95 is provided in the vicinity of the intermediate portion 20c of the airbag 20, and the airbag 20 is two-folded by forming a fold in the vicinity of the intermediate portion 20c in such a manner that the side of the lower edge 20b is brought close to the side of the upper edge 20a. Next, air is absorbed from the winding bar 95, and the winding bar 95 is rotated to approach the side of the upper edge 20a so as to form the roll-folded portion 42. Next, if the winding bar 95 is pulled out from the roll-folded portion 42 and the roll-folded portion 42 is pressed toward the bellows-folded portion 41 while air is discharged from the winding bar 95, the folded body 40 which is provided with the bellows-folded portion 41 and the roll-folded portion 42 can be formed. If the folded body 40 is formed, the tape material 70 is wrapped in a predetermined position to form the bag attachment body 75.

Further, in the case of the embodiment, a breakable tape material 72 (see FIG. 2) is wrapped around a portion covered by the cover 17 in the vicinity of the connection port portion 26, and a tip end side of the inflator 10 where the attachment bracket 11 is attached is inserted into the connection port portion 26. The connection port portion 26 is fastened by the clamp 14 to the inflator 10 from an outer peripheral surface side and connected to the inflator 10. Further, the cover 17 is set, and a breakable tape material 73 (see FIG. 2) is wrapped so as to integrate the cover 17 and the folded body 40. At this time, if the attachment piece portion 32C of the airbag 20 is temporarily held by the attachment plate portion 18 of the cover 17 through using the locking leg portion 15b of the attachment tool 15, the inflator 10 can be assembled to the bag attachment body 75, that is, the airbag device M before being mounted on the vehicle can be assembled.

According to the head portion protection airbag device M assembled in this manner, when being mounted on the vehicle V, the attachment bracket 11 is fastened to the inner panel 2 through using the attachment bolt 13, the inflator 10 is attached to the side of the body 1, the locking leg portions 15b of the attachment tools 15, which are assembled to the attachment plate portions 62 of the twisting restriction members 50F and 50B of the bag attachment body 75 and the attachment plate portion 18 of the cover 17, are inserted and locked in the attachment holes 3 of the inner panel 2, and then the expansion portion 15c is pushed. Further, the attachment seats 32b and 35a assembled to the bag attachment body 75 are attached to the inner panels 2 of the front pillar portion FP and the roof side rail portion RR through using the bolts 15d of the attachment tools 15A. The attachment bracket portion 19 of the cover 17 is also bolted to the inner panel 2 on the side of the body 1, so that the head portion protection airbag device M can be assembled to the vehicle V. After the attachment bracket 11 is bolted to the inner panel 2 on the side of the body 1, the attachment portion 64 constituted by the locking hook of the twisting restriction member 50B is locked in the locking recessed portion 12a of the attachment portion 12 of the attachment bracket 11 when the attachment portion 15 that is temporarily stopped by the attachment plate portion 62 of the twisting restriction member 50 or the like is attached to the side of the body 1.

Thereafter, if a lead wire (not shown) that extends from a control device configured to operate the inflator is connected to the inflator 10, and the front pillar garnish 5, the roof head lining 6, the intermediate pillar garnish 7, and the rear pillar garnish 8 are attached to the inner panel 2 on the side of the body 1, mounting of the head portion protection airbag device M on the vehicle V is completed.

If the head portion protection airbag device M of the embodiment is operated after being mounted on the vehicle V and the inflator 10 supplies the inflation gas G to the airbag 20, the inflation gas G flows into the gas supply path portion 25, the front protection portion 23, and the rear protection portion 24, the airbag cover 9 is pushed open and unfolded downward, and unfoldment and inflation of the airbag 20 are completed such that the vehicle inner sides of the windows W1 and W2, the intermediate pillar portion CP, and the rear pillar portion RP are covered, as shown by a two-dot chain line in FIG. 1.

In the head portion protection airbag device M according to the embodiment, the bag attachment body 75 is formed by wrapping the tape material 70 together with the folded body 40 of the airbag 20 in a state where the twisting restriction members 50 (F, B) are assembled to the side of the upper edge 20a of the airbag 20. Each twisting restriction member 50 (F, B) includes the belt-shaped body portion 51 whose length dimension exceeds the plurality of attachment piece portions 32 of the airbag 20, and the rib 56 that protrudes along the longitudinal direction of the body portion 51 is arranged on the side of the outer surface 51a of the body portion 51. Therefore, a resistance force against twisting is increased by the rib 56 that protrudes from the body portion 51 of the twisting restriction member 50, and thus the bag attachment body 75 (folded body 40) in which the twisting restriction member 50 is assembled in a manner of straddling the plurality of attachment piece portions 32 of the airbag 20 can exhibit a sufficient twisting prevention effect. Further, the twisting restriction member 50 is integrally assembled with the folded body 40 by the tape material 70 configured to prevent unfoldment of the folded body 40 of the airbag 20, and is arranged to straddle the plurality of attachment piece portions 32 of the airbag 20, so that the folded body is not stored in a case as in related art, and it is also possible to prevent occurrence of twisting that causes erroneous assembly, and to directly attach the folding body 40 itself, where the twisting restriction members 50 (F, B) are assembled, to the side of the body 1 of the vehicle as the bag attachment body 75.

Therefore, the head portion protection airbag device M of the embodiment can accurately restrict the twisting of the folded body 40 of the airbag 20 and attach the folded body 40 to the side of the upper edge WU of the windows W1 and W2.

Although the bag attachment body 75 of the embodiment is assembled with the cover 17 that covers the vehicle outer side in the vicinity of the connection port portion 26 of the airbag 20, the bag attachment body may also be formed without using the cover 17, and the airbag device M may be formed by connecting the inflator 10, where the attachment bracket 11 is attached, to the connection port portion 26 of the bag attachment body and then mounted on the vehicle.

In the head portion protection airbag device M of the embodiment, the folded body 40 obtained by folding the airbag 20 has the substantially cylindrical shape, the body portion 51 has the curved cross-sectional shape corresponding to the outer peripheral surface of the folded body 40, the rib 56 is the ridge along the longitudinal direction of the body portion 51 and protrudes from the body portion 51 in the radial direction from the center C of the folded body 40.

Therefore, according to the embodiment, even when the folded body 40 is twisted in a clockwise direction or a counterclockwise direction with respect to the cross-sectional center C (see FIG. 4), the rib 56 can exert equivalent twisting resistance forces in both directions, so that the twisting of the folded body 40 can be accurately restricted without being limited by directions of the twisting.

According to the head portion protection airbag device M of the embodiment, each twisting restriction member 50 (F, B) includes the positioning portion 58 which can be assembled to a plurality of the positioning locations 30 provided on the side of the upper edge 20a of the airbag 20, and thus the twisting restriction members 50 (F, B) can be assembled to the side of the upper edge 20a of the airbag 20 before the folding.

Therefore, according to the embodiment, the folded body 40 where the twisting restriction members 50 (F, B) are assembled, in other words, the bag attachment body 75 to be attached to the vehicle can be easily obtained by assembling the positioning portion 58 to the positioning hole 30a of the positioning location 30 on the side of the upper edge 20a of the flatly unfolded airbag 20 before the folding, arranging the twisting restriction members 50 (F, B) on the side of the upper edge 20a of the airbag 20 and then forming the folded body 40 obtained by folding the airbag 20 by the folding process of simply bringing the side of the lower edge 20b of the airbag 20 itself close to the side of the upper edge 20a, and subsequently wrapping the tape material 70. That is, the bag attachment body 75 that can be attached to the vehicle can be formed by simply assembling the twisting restriction members 50 (F, B) in advance to the side of the upper edge 20a of the airbag 20 and then performing the normal folding process of the airbag 20 and a wrapping process of the tape material 70, so that the bag attachment body 75 can be formed without consuming much time and effort as compared with, for example, a case where the assembly of the twisting restriction members and the wrapping of the tape material are performed with respect to the folded body after the folding.

Further, according to the head portion protection airbag device M of the embodiment, each twisting restriction member 50 (F, B) includes the attachment plate portion 62 that is superimposed on the attachment piece portions 32 (A, B, D, E) and attached to the body 1 together with the attachment piece portions 32 (A, B, D, E).

Therefore, according to the embodiment, alignment of the folded body 40 with respect to the side of the body 1 and an orientation from the cross-sectional center C (peripheral direction arrangement position) can be defined by using the attachment plate portion 62 attached to the side of the body 1, so that the bag attachment body 75 in which the twisting restriction members 50 (F, B) are assembled to the folded body 40 can be attached to the side of the body 1 at a predetermined position in a predetermined posture.

Figure 13:
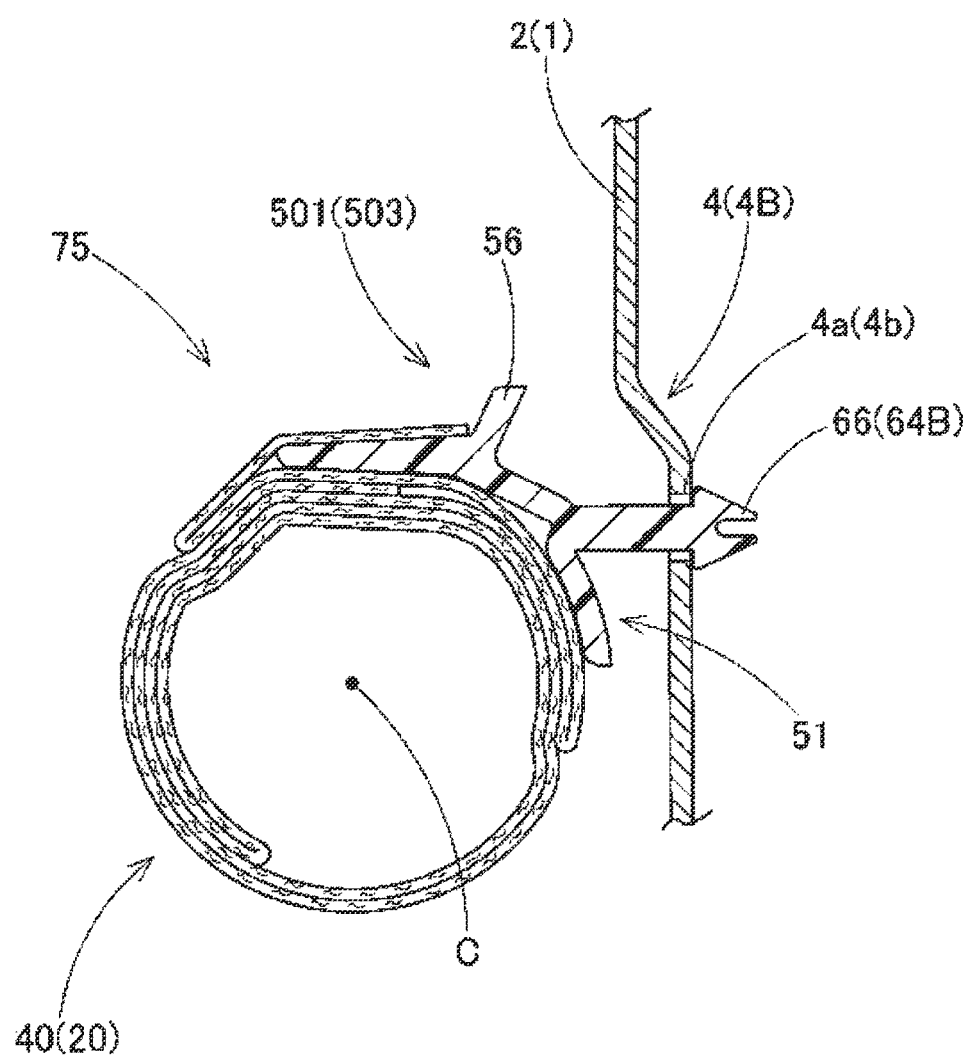
FIG. 13 is a schematic sectional view showing a modification of the bag attachment body of the embodiment.

In a way that allows such an operational effect to be obtained, as shown in FIG. 13, if a twisting restriction member 501 includes an assembly portion 66 that can be assembled to a positioning assembly location 4 provided on the inner panel 2 on the side of the body 1, the alignment of the folded body 40 with respect to the side of the body 1 and the orientation from the cross-sectional center C (peripheral direction arrangement position) can be defined in the same manner as described above by using the assembly portion 66, so that the bag attachment body 75 in which the twisting restriction member 501 is assembled to the folded body 40 can be attached to the side of the body 1 at the predetermined position in the predetermined posture. In the shown example, the assembly portion 66 of the twisting restriction member 501 is a clip, and the assembly location 4 on the side of the body 1 is provided with an attachment hole 4a where the clip serving as the assembly portion 66 is inserted and locked.

According to the head portion protection airbag device M of the embodiment, the twisting restriction member 50B includes, at the terminal (front end) of the body portion 51, the attachment portion 64 attached to the attachment bracket 11, which is a component of the head portion protection airbag device M. The attachment portion 64 is configured as the locking hook which includes the head portion 64a whose diameter is expanded at the tip end of the bent shaft portion 64b. The attachment portion 12 of the attachment bracket 11 is provided with the locking recessed portion 12a where the locking hook 64 is fitted from above and locked therein in such a manner that movement toward the vehicle inner side and downward movement are restricted (see FIG. 12).

With such a configuration, if the twisting restriction member 50B includes, at the terminal, the attachment portion 64 that is attached to the attachment bracket 11 serving as the component of the head portion protection airbag device M, the attachment portion 64 of the terminal can be attached to the corresponding component (attachment bracket) of the head portion protection airbag device M even when the attachment piece portion 32 of the airbag 20 is not provided on the terminal portion, and thus a portion of the folded body 40 near the terminal can be arranged at the predetermined position in the predetermined posture.

Figure 14:
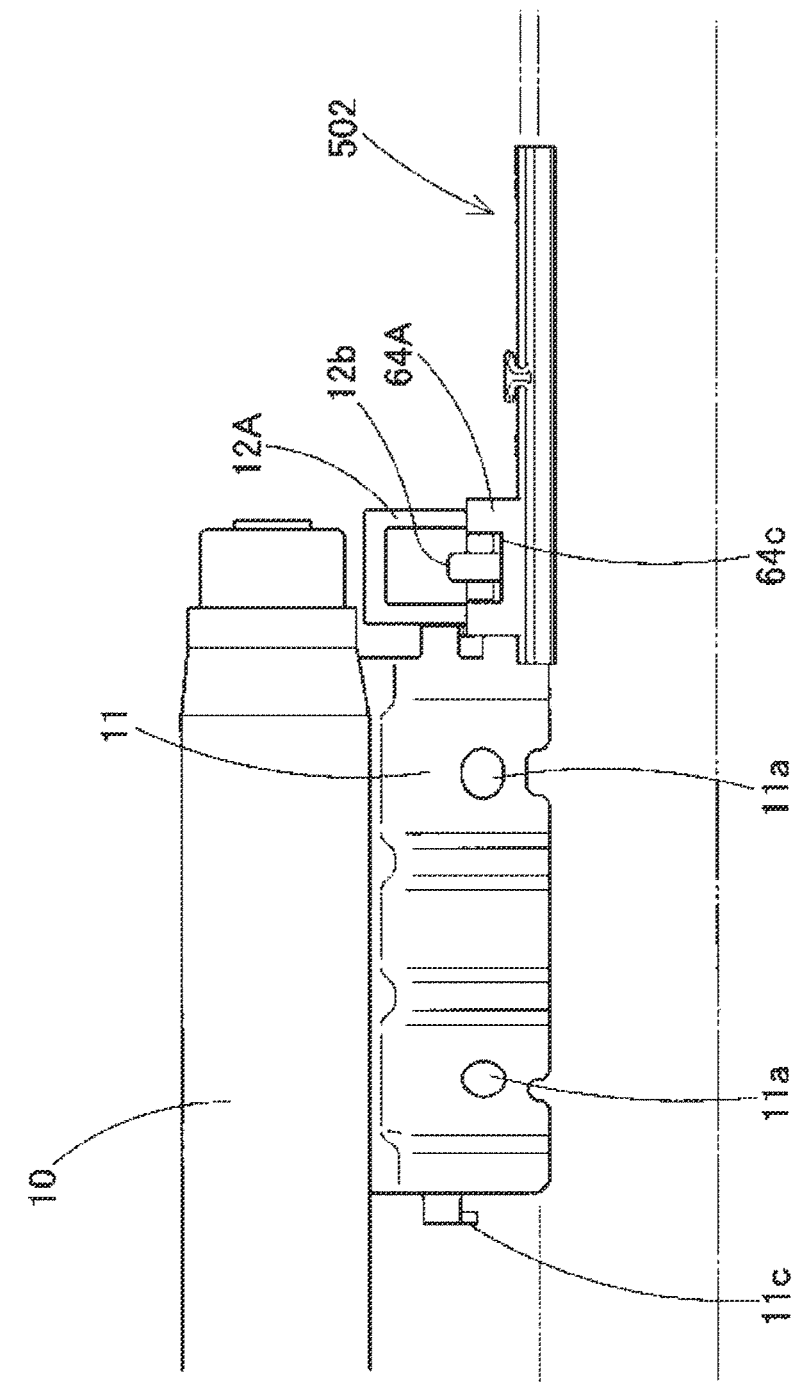
FIG. 14 is a schematic partial front view showing another modification of the bag attachment body of the embodiment.
Figure 15:
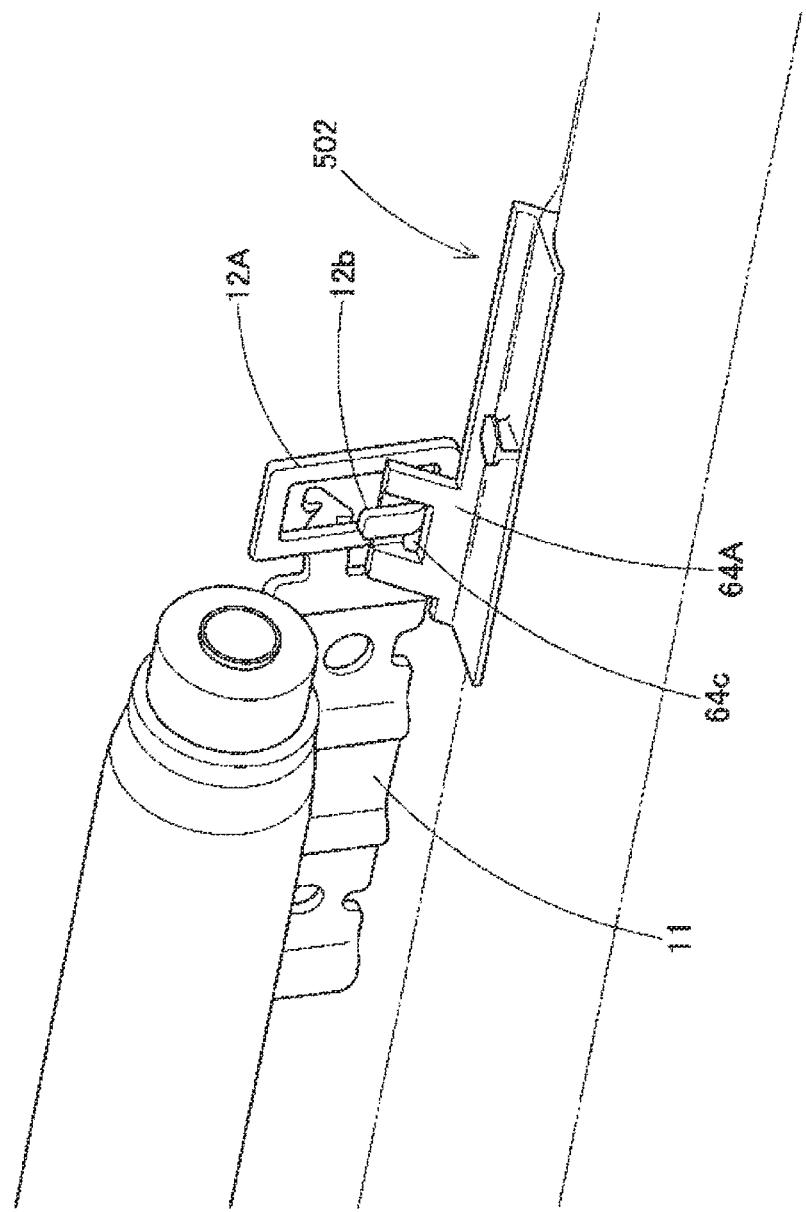
FIG. 15 is a schematic partial perspective view of the bag attachment body shown in FIG. 14.

As a modification of such an attachment portion, for example, as shown in FIGS. 14 and 15, an attachment portion 64A, in which a locking pin 12b protruding upward is provided while a fitting recessed portion 64c where the locking pin 12b is inserted and locked is provided in a terminal of a twisting restriction member 502, may be provided as an attachment portion 12A provided on the attachment bracket 11.

Needless to say, a component other than the inflator attachment bracket, for example, the inflator itself may also serve as the component of the airbag device where the terminal of the twisting restriction member is attached, namely the terminal of the twisting restriction member may also be attached to the inflator.

Further, an attachment portion 64B provided at the terminal of the twisting restriction member may be formed by the clip 66 itself as shown in FIG. 13, a portion of the inner panel 2 on the side of the body 1 where the assembly hole 4a is provided may serve as an attachment portion 4B, and the attachment portion 64B formed of the clip 66 may be attached to an attachment hole 4b (assembly hole 4a) of the attachment portion 4B. In this case, the attachment portion 64B can be attached to the corresponding attachment hole 4b of the attachment portion 4B on the side of the body 1, and the portion of the folded body 40 near the terminal can still be provided at the predetermined position in the predetermined posture.

Needless to say, a clip type attachment portion that can be inserted and attached in this manner may be provided at the terminal of the twisting restriction member, and the clip type attachment portion may also be attached to a component of the airbag device.

Although the cover 17 covering the vehicle outer side in the vicinity of the connection port portion 26 of the airbag 20 is used in the head portion protection airbag device M of the embodiment, the cover 17 may also not be used. In this case, the airbag device M may be configured simply by assembling the inflator 10, where the attachment bracket 11 is attached, to the bag attachment body 75.

What is claimed is:

1. A head portion protection airbag device comprising:
   an airbag, which is attached to an upper edge side of a window of a vehicle and is configured to be unfolded and inflated so as to cover the window when inflation gas flows in, wherein:
   the airbag is:
   formed into a folded body which is folded such that a lower edge side in an unfolded state approaches an upper edge side;
   wrapped with an unfoldment preventing tape material and attached to the upper edge side of the window;
   assembled with a twisting restriction member, which is configured to prevent twisting of the folded body, on the upper edge side of the airbag; and
   attached to the upper edge side of the window as a bag attachment body;
   a plurality of attachment piece portions, which are attached to a body side of the vehicle, are arranged side by side on the upper edge side of the airbag;
   the twisting restriction member includes:
   a belt-shaped body portion extending beyond a location of the plurality of attachment piece portions;
   a rib which is arranged on an outer surface side of the body portion and protrudes along a longitudinal direction of the body portion;
   a positioning portion enabled to be assembled to a portion on an upper edge side of a peripheral edge portion of the airbag which is exposed when the airbag is folded; and
   the bag attachment body is wrapped with the tape material in a state where the twisting restriction member is assembled to the upper edge side of the airbag in the folded body.

2. The head portion protection airbag device according to claim 1, wherein:
   the folded body formed by folding the airbag has a substantially cylindrical shape;
   the body portion has a curved cross-sectional shape which corresponds to an outer peripheral surface of the folded body; and
   the rib is a ridge along the longitudinal direction of the body portion, and is protruded from the body portion in a radial direction from a center of the folded body.

3. The head portion protection airbag device according to claim 1, wherein:
   the positioning portion is enabled to be assembled to a plurality of positioning locations provided on the upper edge side of the airbag; and
   the twisting restriction member is enabled to be assembled to the upper edge side of the airbag before folding.

4. The head portion protection airbag device according to claim 1, wherein
   the twisting restriction member includes an attachment plate portion which is superimposed with the plurality of attachment piece portions and attached to the body together with the plurality of attachment piece portions.

5. The head portion protection airbag device according to claim 1, wherein
   the twisting restriction member includes an assembly portion enabled to be assembled to a positioning assembly location provided on the body side.

6. The head portion protection airbag device according to claim 1, wherein
   the twisting restriction member includes, at a terminal of the body portion, an attachment portion attached to a component of the head portion protection airbag device or the body side.

\* \* \* \* \*